United States Patent
Niergarth et al.

(10) Patent No.: US 9,869,190 B2
(45) Date of Patent: Jan. 16, 2018

(54) VARIABLE-PITCH ROTOR WITH REMOTE COUNTERWEIGHTS

(71) Applicant: General Electric Company, Schenectady, NY (US)

(72) Inventors: Daniel Alan Niergarth, Cincinnati, OH (US); Brandon Wayne Miller, Cincinnati, OH (US); Donald Albert Bradley, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 14/708,353

(22) Filed: May 11, 2015

(65) Prior Publication Data

US 2016/0032740 A1 Feb. 4, 2016

Related U.S. Application Data (60) Provisional application No. 62/005,572, filed on May 30, 2014.

(51) Int. Cl.
*F02C 3/04* (2006.01)
*F01D 7/02* (2006.01)
(Continued)

(52) U.S. Cl.
CPC ............... *F01D 7/02* (2013.01); *F01D 5/02* (2013.01); *F01D 21/08* (2013.01); *F02C 3/04* (2013.01);
(Continued)

(58) Field of Classification Search
CPC ... F01D 21/08; F01D 5/02; F01D 7/02; F02C 3/04; F05D 2220/32; F05D 2220/36;
(Continued)

(56) References Cited

U.S. PATENT DOCUMENTS

| 493,623 A | 3/1893 | Harris |
|---|---|---|
| 1,951,321 A | 3/1934 | Blanchard |

(Continued)

FOREIGN PATENT DOCUMENTS

| CA | 2241940 A1 | 7/1997 |
|---|---|---|
| CA | 2917362 A1 | 7/1997 |

(Continued)

OTHER PUBLICATIONS

U.S. Non-Final Office Action issued in connection with related U.S. Appl. No. 14/873,382 dated Jan. 25, 2016.

(Continued)

*Primary Examiner* — Jesse Bogue
(74) *Attorney, Agent, or Firm* — General Electric Company; William Scott Andes (57) ABSTRACT

A pitch control mechanism includes: a rotor structure configured for rotation about a longitudinal axis; a row of blades carried by the rotor structure, each blade having an airfoil and a trunnion mounted for pivoting movement relative to the rotor structure, about a trunnion axis which is perpendicular to the longitudinal axis; a unison ring interconnecting the blades; an actuator connected to the unison ring and the rotor structure, operable to move the unison ring relative to the rotor structure; at least one moveable counterweight carried by the rotor structure, remote from the blades; and an interconnection between the blades and the counterweight, such that movement of the counterweight causes a change in the pitch angle of the blades.

19 Claims, 9 Drawing Sheets

(51) Int. Cl.
    *F01D 21/08* (2006.01)
    *F01D 5/02* (2006.01)
(52) U.S. Cl.
    CPC ...... *F05D 2220/32* (2013.01); *F05D 2220/36* (2013.01); *F05D 2240/30* (2013.01); *F05D 2260/53* (2013.01); *F05D 2260/77* (2013.01); *F05D 2260/79* (2013.01); *F05D 2270/021* (2013.01); *F05D 2270/09* (2013.01); *F05D 2270/58* (2013.01); *Y02T 50/673* (2013.01)
(58) Field of Classification Search
    CPC .............. F05D 2240/30; F05D 2260/53; F05D 2260/77; F05D 2260/79; F05D 2270/021; F05D 2270/09; F05D 2270/58; Y02T 50/673
    See application file for complete search history.

(56) References Cited

U.S. PATENT DOCUMENTS

| | | | |
|---|---|---|---|
| 2,177,315 A | 10/1939 | Caria |
| 2,353,334 A | 7/1944 | Haugh |
| 2,417,406 A | 3/1947 | Burkhalter, Jr. |
| 2,518,431 A | 8/1950 | Wildhaber |
| 2,566,696 A | 9/1951 | Cushman |
| 2,648,391 A | 8/1953 | Cushman et al. |
| 2,665,055 A | 1/1954 | Adams, Jr. |
| 2,955,656 A | 10/1960 | Balje et al. |
| 3,560,110 A | 2/1971 | Cornell |
| 3,781,131 A | 12/1973 | McMurtry |
| 3,922,852 A | 12/1975 | Drabek |
| 3,988,889 A | 11/1976 | Chamay et al. |
| 3,994,128 A | 11/1976 | Griswold, Jr. et al. |
| 4,141,664 A | 2/1979 | Moran et al. |
| 4,411,596 A | 10/1983 | Chilman |
| 4,578,019 A | 3/1986 | Safarik |
| 4,671,737 A | 6/1987 | Whitehouse |
| 4,704,862 A | 11/1987 | Dennison et al. |
| 4,913,623 A * | 4/1990 | Schilling ............... B64C 11/346 416/129 |
| 4,936,748 A | 6/1990 | Adamson et al. |
| 4,969,325 A | 11/1990 | Adamson et al. |
| 4,976,102 A | 12/1990 | Taylor |
| 5,010,729 A | 4/1991 | Adamson et al. |
| 5,015,150 A | 5/1991 | Rohra |
| 5,257,907 A | 11/1993 | Seidel |
| 5,263,898 A | 11/1993 | Elston, III et al. |
| 5,284,418 A | 2/1994 | Moriya |
| 5,431,539 A | 7/1995 | Carvalho |
| 5,501,575 A | 3/1996 | Eldredge et al. |
| 5,529,263 A | 6/1996 | Rudolph |
| 5,542,357 A | 8/1996 | Gerhardt |
| 5,562,417 A | 10/1996 | Grimm et al. |
| 5,617,719 A | 4/1997 | Ginter |
| 5,630,701 A | 5/1997 | Lawer |
| 5,727,757 A | 3/1998 | Nyhus |
| 5,779,446 A | 7/1998 | Althof et al. |
| 5,810,555 A | 9/1998 | Savage et al. |
| 5,897,293 A | 4/1999 | Arel et al. |
| 5,904,320 A | 5/1999 | Tindell |
| 5,931,636 A | 8/1999 | Savage et al. |
| 5,967,461 A | 10/1999 | Farrington |
| 5,974,882 A | 11/1999 | Heath |
| 5,977,677 A | 11/1999 | Henry et al. |
| 5,988,307 A | 11/1999 | Yamada et al. |
| 6,000,635 A | 12/1999 | Justice |
| 6,027,383 A | 2/2000 | Broinowski |
| 6,071,077 A | 6/2000 | Rowlands |
| 6,112,512 A | 9/2000 | Miller et al. |
| 6,112,513 A | 9/2000 | Catt et al. |
| 6,112,523 A | 9/2000 | Kamo et al. |
| 6,148,605 A | 11/2000 | Lardellier |
| 6,158,894 A | 12/2000 | Pujari et al. |
| 6,173,908 B1 | 1/2001 | Bureaux et al. |
| 6,195,981 B1 | 3/2001 | Hanley et al. |
| 6,226,974 B1 | 5/2001 | Andrew et al. |
| 6,247,311 B1 | 6/2001 | Itoyama et al. |
| 6,260,794 B1 | 7/2001 | Rowe |
| 6,270,309 B1 | 8/2001 | Ghetzler et al. |
| 6,276,127 B1 | 8/2001 | Alberti |
| 6,289,666 B1 | 9/2001 | Ginter |
| 6,292,763 B1 | 9/2001 | Dunbar et al. |
| 6,308,740 B1 | 10/2001 | Smith et al. |
| 6,314,721 B1 | 11/2001 | Mathews et al. |
| 6,324,828 B1 | 12/2001 | Willis et al. |
| 6,332,313 B1 | 12/2001 | Willis et al. |
| 6,332,754 B1 | 12/2001 | Matsuda et al. |
| 6,349,682 B1 | 2/2002 | Alexius et al. |
| 6,386,830 B1 | 5/2002 | Slipper et al. |
| 6,416,015 B1 | 7/2002 | Carson |
| 6,439,840 B1 | 8/2002 | Tse |
| 6,450,369 B1 | 9/2002 | Heyes |
| 6,464,459 B2 | 10/2002 | Illingworth |
| 6,499,286 B1 | 12/2002 | Zakharov et al. |
| 6,516,603 B1 | 2/2003 | Urbach et al. |
| 6,520,286 B1 | 2/2003 | Frederiksen et al. |
| 6,543,998 B1 | 4/2003 | Scharl |
| 6,557,503 B2 | 5/2003 | Hampson |
| 6,557,799 B1 | 5/2003 | Sternberger |
| 6,564,556 B2 | 5/2003 | Ginter |
| 6,565,334 B1 | 5/2003 | Bradbury et al. |
| 6,647,708 B2 | 11/2003 | Bornhoft et al. |
| 6,651,439 B2 | 11/2003 | Al-Roub et al. |
| 6,687,596 B2 | 2/2004 | Humerickhouse et al. |
| 6,691,515 B2 | 2/2004 | Verdouw et al. |
| 6,708,905 B2 | 3/2004 | Borissov et al. |
| 6,722,847 B2 | 4/2004 | Freeman et al. |
| 6,749,395 B1 | 6/2004 | Reichert et al. |
| 6,802,185 B2 | 10/2004 | Furukawa et al. |
| 6,820,431 B2 | 11/2004 | McManus et al. |
| 6,866,610 B2 | 3/2005 | Ito |
| 6,885,129 B1 | 4/2005 | Oohashi et al. |
| 6,885,917 B2 | 4/2005 | Osder et al. |
| 6,942,453 B2 | 9/2005 | Tsuru et al. |
| 6,942,458 B2 | 9/2005 | McCallum et al. |
| 6,964,170 B2 | 11/2005 | Alkabie |
| 6,969,235 B2 | 11/2005 | Feest |
| 6,981,365 B1 | 1/2006 | Johnson |
| 7,007,483 B2 | 3/2006 | Peters |
| 7,043,900 B2 | 5/2006 | Shirakawa et al. |
| 7,048,206 B2 | 5/2006 | Waelti et al. |
| 7,055,329 B2 | 6/2006 | Martens et al. |
| 7,083,773 B2 | 8/2006 | Kwon et al. |
| 7,100,868 B2 | 9/2006 | Stephan |
| RE39,479 E | 1/2007 | Tressler et al. |
| 7,189,059 B2 | 3/2007 | Barton et al. |
| 7,204,676 B2 | 4/2007 | Dutton et al. |
| 7,252,478 B2 | 8/2007 | Aynsley |
| 7,293,401 B2 | 11/2007 | Papamoschou |
| 7,306,434 B2 | 12/2007 | Goldfinch |
| 7,308,966 B2 | 12/2007 | Gupta |
| 7,310,951 B2 | 12/2007 | Kasahara |
| 7,318,619 B2 | 1/2008 | Munro et al. |
| 7,320,748 B2 | 1/2008 | Hemighaus et al. |
| 7,341,225 B2 | 3/2008 | Stretton et al. |
| 7,406,826 B2 | 8/2008 | Hayashi et al. |
| 7,424,413 B2 | 9/2008 | Brooke et al. |
| 7,503,750 B1 | 3/2009 | Violette |
| 7,520,124 B2 | 4/2009 | Narayanan et al. |
| 7,543,452 B2 | 6/2009 | Reba et al. |
| 7,549,293 B2 | 6/2009 | Gallagher et al. |
| 7,600,371 B2 | 10/2009 | Sternberger |
| 7,608,181 B2 | 10/2009 | O'Rear |
| 7,624,567 B2 | 12/2009 | Peters |
| 7,625,128 B2 | 12/2009 | Gillespie |
| 7,631,484 B2 | 12/2009 | Giffin et al. |
| 7,637,716 B2 | 12/2009 | Benton |
| 7,681,398 B2 | 3/2010 | Patel et al. |
| 7,735,601 B1 | 6/2010 | Stieger et al. |
| 7,753,036 B2 | 7/2010 | Lents et al. |
| 7,801,669 B2 | 9/2010 | Nagae |
| 7,863,767 B2 | 1/2011 | Chapple et al. |
| 7,878,130 B2 | 2/2011 | Yamamoto et al. |

(56) References Cited

U.S. PATENT DOCUMENTS

| | | |
|---|---|---|
| 7,901,657 B2 | 3/2011 | Arpac et al. |
| 7,918,090 B2 | 4/2011 | Suzuki et al. |
| 7,918,608 B2 | 4/2011 | Braun |
| 7,918,646 B2 | 4/2011 | Akcasu |
| 7,934,368 B2 | 5/2011 | Mueller et al. |
| 7,963,364 B2 | 6/2011 | Nadler et al. |
| 7,980,810 B2 | 7/2011 | Unno |
| 8,051,830 B2 | 11/2011 | Taylor |
| 8,074,440 B2 | 12/2011 | Kohlenberg et al. |
| 8,074,924 B2 | 12/2011 | Cros |
| 8,075,270 B2 | 12/2011 | Violette et al. |
| 8,087,251 B2 | 1/2012 | Iwasaki et al. |
| 8,087,870 B2 | 1/2012 | Flucker et al. |
| 8,089,173 B2 | 1/2012 | Freda |
| 8,092,150 B2 | 1/2012 | Rofka et al. |
| 8,100,665 B2 | 1/2012 | De Filippis et al. |
| 8,100,671 B2 | 1/2012 | Botros et al. |
| 8,122,724 B2 | 2/2012 | Slovisky et al. |
| RE43,252 E | 3/2012 | Ginter et al. |
| 8,133,027 B2 | 3/2012 | Carvalho et al. |
| 8,205,827 B2 | 6/2012 | Kerrebrock et al. |
| 8,220,443 B2 | 7/2012 | Murata et al. |
| 8,225,593 B2 | 7/2012 | Le Hong et al. |
| 8,261,527 B1 | 9/2012 | Stearns et al. |
| 8,262,358 B1 | 9/2012 | Muylaert et al. |
| 8,276,360 B2 | 10/2012 | Poisson et al. |
| 8,308,423 B2 | 11/2012 | Berryann et al. |
| 8,308,426 B2 | 11/2012 | Cigal et al. |
| 8,365,513 B2 | 2/2013 | McVey |
| 8,365,515 B2 | 2/2013 | Migliaro, Jr. |
| 8,366,382 B1 | 2/2013 | Muldoon et al. |
| 8,366,385 B2 | 2/2013 | Davis et al. |
| 8,376,696 B2 | 2/2013 | Suzuki et al. |
| 8,382,430 B2 | 2/2013 | Parry et al. |
| 8,387,570 B2 | 3/2013 | Firey |
| 8,413,418 B2 | 4/2013 | Mason et al. |
| 8,418,436 B2 | 4/2013 | Pero et al. |
| 8,418,964 B2 | 4/2013 | Leblanc et al. |
| 8,439,637 B2 | 5/2013 | Dibenedetto et al. |
| 8,443,586 B2 | 5/2013 | Schwark, Jr. et al. |
| 8,448,451 B2 | 5/2013 | Nakamura et al. |
| 8,453,458 B2 | 6/2013 | Whurr et al. |
| 8,460,779 B2 | 6/2013 | Gupta et al. |
| 8,499,626 B2 | 8/2013 | Greciet et al. |
| 8,517,665 B2 | 8/2013 | Lugo et al. |
| 8,529,192 B2 | 9/2013 | Beers et al. |
| 8,544,793 B1 | 10/2013 | Shammoh |
| 8,562,284 B2 | 10/2013 | Bradbrook |
| 8,572,943 B1 | 11/2013 | Sheridan |
| 8,601,786 B2 | 12/2013 | Hurwitz et al. |
| 8,606,543 B2 | 12/2013 | Naslund et al. |
| 8,622,697 B2 | 1/2014 | Bortoli et al. |
| 8,646,721 B2 | 2/2014 | Chapman et al. |
| 8,668,463 B2 | 3/2014 | Yilmaz |
| 8,702,381 B2 | 4/2014 | Alajbegovic et al. |
| 8,708,256 B2 | 4/2014 | Kobayashi |
| 8,708,640 B2 | 4/2014 | Power |
| 8,713,910 B2 | 5/2014 | Stuart et al. |
| 8,747,054 B2 | 6/2014 | Witlicki |
| 8,777,793 B2 | 7/2014 | Sheridan |
| 8,793,971 B2 | 8/2014 | Dyer et al. |
| 8,794,542 B1 | 8/2014 | Hunter et al. |
| 8,794,846 B2 | 8/2014 | Hashish |
| 8,794,910 B2 | 8/2014 | Gasmen et al. |
| 8,806,850 B2 | 8/2014 | Winter et al. |
| 8,807,921 B2 | 8/2014 | Struziak |
| 8,814,502 B2 | 8/2014 | Eleftheriou |
| 8,814,510 B2 | 8/2014 | Colson et al. |
| 8,820,090 B2 | 9/2014 | Lee et al. |
| 8,820,091 B2 | 9/2014 | Tham et al. |
| 8,827,203 B2 | 9/2014 | Balk |
| 8,827,639 B2 | 9/2014 | Beers et al. |
| 8,834,028 B2 | 9/2014 | Winkler et al. |
| 8,834,095 B2 | 9/2014 | Davis |
| 8,834,099 B1 | 9/2014 | Topol et al. |
| 8,840,375 B2 | 9/2014 | Virkler |
| 8,851,754 B2 | 10/2014 | Dettmar et al. |
| 8,857,149 B1 | 10/2014 | Muldoon |
| 8,857,193 B2 | 10/2014 | Thies |
| 8,863,529 B2 | 10/2014 | Starr |
| 9,090,336 B2 * | 7/2015 | Gallet .................. B64C 11/306 |
| 2002/0124991 A1 | 9/2002 | Wilson et al. |
| 2002/0162394 A1 | 11/2002 | Loftus et al. |
| 2003/0163983 A1 | 9/2003 | Seda et al. |
| 2003/0163984 A1 | 9/2003 | Seda et al. |
| 2003/0215330 A1 | 11/2003 | Haller |
| 2004/0123583 A1 | 7/2004 | Nordeen et al. |
| 2004/0129392 A1 | 7/2004 | Crane et al. |
| 2004/0261396 A1 | 12/2004 | Sammann et al. |
| 2005/0068232 A1 | 3/2005 | Smith et al. |
| 2005/0178105 A1 | 8/2005 | Kawamoto et al. |
| 2005/0241292 A1 | 11/2005 | Taylor et al. |
| 2005/0276693 A1 | 12/2005 | Liu |
| 2006/0024162 A1 | 2/2006 | Giffin |
| 2006/0090451 A1 | 5/2006 | Moniz et al. |
| 2006/0096293 A1 | 5/2006 | Norris et al. |
| 2006/0272314 A1 | 12/2006 | Moniz et al. |
| 2006/0275111 A1 | 12/2006 | Orlando et al. |
| 2007/0084186 A1 | 4/2007 | Orlando et al. |
| 2007/0130959 A1 | 6/2007 | Linet et al. |
| 2007/0157595 A1 | 7/2007 | Lockwood, Jr. |
| 2008/0022691 A1 | 1/2008 | Kennepohl et al. |
| 2008/0056894 A1 | 3/2008 | Tsifourdaris et al. |
| 2008/0089630 A1 | 4/2008 | Glueck |
| 2008/0098713 A1 | 5/2008 | Orlando et al. |
| 2008/0118360 A1 | 5/2008 | Findlay et al. |
| 2008/0124221 A1 | 5/2008 | Kidikian et al. |
| 2008/0138195 A1 | 6/2008 | Kern et al. |
| 2008/0140352 A1 | 6/2008 | Goebel et al. |
| 2008/0143108 A1 | 6/2008 | El-Refaie et al. |
| 2008/0149445 A1 | 6/2008 | Kern et al. |
| 2008/0155961 A1 | 7/2008 | Johnson |
| 2008/0273969 A1 | 11/2008 | Murrow et al. |
| 2008/0283676 A1 | 11/2008 | Jain et al. |
| 2009/0016870 A1 | 1/2009 | Kodama et al. |
| 2009/0068003 A1 | 3/2009 | Sharma et al. |
| 2009/0112535 A1 | 4/2009 | Phillips |
| 2009/0133381 A1 | 5/2009 | Holmes et al. |
| 2009/0199536 A1 | 8/2009 | Bulin et al. |
| 2009/0211221 A1 | 8/2009 | Roberge |
| 2009/0257878 A1 | 10/2009 | Hernandez et al. |
| 2009/0314082 A1 | 12/2009 | Sujan et al. |
| 2010/0000222 A1 | 1/2010 | Price et al. |
| 2010/0019101 A1 | 1/2010 | Smith et al. |
| 2010/0034659 A1 | 2/2010 | Fujimura |
| 2010/0058769 A1 | 3/2010 | Baran |
| 2010/0061856 A1 | 3/2010 | Demania et al. |
| 2010/0061860 A1 | 3/2010 | Riaz et al. |
| 2010/0061861 A1 | 3/2010 | Riaz et al. |
| 2010/0089019 A1 | 4/2010 | Knight et al. |
| 2010/0092295 A1 | 4/2010 | Riaz et al. |
| 2010/0154761 A1 | 6/2010 | Okumura et al. |
| 2010/0192595 A1 | 8/2010 | Orlando et al. |
| 2010/0193644 A1 | 8/2010 | Karem |
| 2010/0280730 A1 | 11/2010 | Page et al. |
| 2010/0300087 A1 | 12/2010 | Liu et al. |
| 2010/0305011 A1 | 12/2010 | Frapin et al. |
| 2010/0326753 A1 | 12/2010 | Garside |
| 2011/0004388 A1 | 1/2011 | Winter |
| 2011/0036086 A1 | 2/2011 | Liu et al. |
| 2011/0052370 A1 | 3/2011 | Karpman et al. |
| 2011/0061381 A1 | 3/2011 | Harris et al. |
| 2011/0076158 A1 | 3/2011 | Giffin et al. |
| 2011/0083641 A1 | 4/2011 | Gokhale et al. |
| 2011/0092726 A1 | 4/2011 | Clarke |
| 2011/0118071 A1 | 5/2011 | De Maziere |
| 2011/0120082 A1 | 5/2011 | Giffin et al. |
| 2011/0167784 A1 | 7/2011 | Johnson et al. |
| 2011/0167792 A1 | 7/2011 | Johnson et al. |
| 2011/0167831 A1 | 7/2011 | Johnson |
| 2011/0189003 A1 | 8/2011 | Iida |
| 2011/0243719 A1 | 10/2011 | Murphy et al. |
| 2011/0268578 A1 | 11/2011 | Praisner et al. |
| 2011/0277448 A1 | 11/2011 | Roberts |

(56) References Cited

U.S. PATENT DOCUMENTS

| | | |
|---|---|---|
| 2011/0286842 A1 | 11/2011 | Danielson et al. |
| 2011/0288744 A1 | 11/2011 | Gokhale et al. |
| 2011/0290483 A1 | 12/2011 | Zornes |
| 2012/0011825 A1 | 1/2012 | Hall et al. |
| 2012/0036843 A1 | 2/2012 | Schertz et al. |
| 2012/0045334 A1 | 2/2012 | Bouru et al. |
| 2012/0056034 A1 | 3/2012 | Kosheleff |
| 2012/0073263 A1 | 3/2012 | Kohlenberg et al. |
| 2012/0085861 A1 | 4/2012 | Mardjono et al. |
| 2012/0087780 A1 | 4/2012 | Suciu et al. |
| 2012/0096853 A1 | 4/2012 | Taylor |
| 2012/0097801 A1 | 4/2012 | Barrett |
| 2012/0110979 A1 | 5/2012 | Rosenkrans et al. |
| 2012/0117940 A1 | 5/2012 | Winter |
| 2012/0117975 A1 | 5/2012 | Sharma et al. |
| 2012/0121390 A1 | 5/2012 | Suciu et al. |
| 2012/0152007 A1 | 6/2012 | Holmes et al. |
| 2012/0171018 A1 | 7/2012 | Hasel et al. |
| 2012/0174593 A1 | 7/2012 | Sharma et al. |
| 2012/0198815 A1 | 8/2012 | Suciu et al. |
| 2012/0198816 A1 | 8/2012 | Suciu et al. |
| 2012/0198817 A1 | 8/2012 | Suciu et al. |
| 2012/0210710 A1 | 8/2012 | Chevalier et al. |
| 2012/0210711 A1 | 8/2012 | Petrovic et al. |
| 2012/0222397 A1 | 9/2012 | Smith et al. |
| 2012/0222398 A1 | 9/2012 | Smith et al. |
| 2012/0237334 A1 | 9/2012 | McCune et al. |
| 2012/0238401 A1 | 9/2012 | McCune et al. |
| 2012/0251306 A1 | 10/2012 | Reinhardt et al. |
| 2012/0255292 A1 | 10/2012 | Fong et al. |
| 2012/0257960 A1 | 10/2012 | Reinhardt et al. |
| 2012/0275904 A1 | 11/2012 | McCune et al. |
| 2012/0279198 A1 | 11/2012 | Erickson et al. |
| 2012/0291449 A1 | 11/2012 | Adams et al. |
| 2012/0292440 A1 | 11/2012 | Kosheleff |
| 2012/0321476 A1 | 12/2012 | MacKie et al. |
| 2012/0328436 A1 | 12/2012 | Soidel et al. |
| 2013/0000314 A1 | 1/2013 | McCaffrey |
| 2013/0004297 A1 | 1/2013 | Sheridan |
| 2013/0008144 A1 | 1/2013 | Gallagher et al. |
| 2013/0008146 A1 | 1/2013 | Gallagher et al. |
| 2013/0011261 A1 | 1/2013 | Boston et al. |
| 2013/0014490 A1 | 1/2013 | Suciu et al. |
| 2013/0028733 A1 | 1/2013 | McCune |
| 2013/0067917 A1 | 3/2013 | Nagurney et al. |
| 2013/0068200 A1 | 3/2013 | Reynolds et al. |
| 2013/0074492 A1 | 3/2013 | Chi et al. |
| 2013/0074512 A1 | 3/2013 | Tillery |
| 2013/0081374 A1 | 4/2013 | Giffin et al. |
| 2013/0091852 A1 | 4/2013 | Wood et al. |
| 2013/0094937 A1 | 4/2013 | Glahn et al. |
| 2013/0094943 A1 | 4/2013 | Bouru et al. |
| 2013/0096786 A1 | 4/2013 | Jang |
| 2013/0098046 A1 | 4/2013 | Suciu et al. |
| 2013/0098050 A1 | 4/2013 | Kupratis |
| 2013/0098055 A1 | 4/2013 | Kupratis |
| 2013/0104560 A1 | 5/2013 | Kupratis |
| 2013/0125561 A1 | 5/2013 | Schwarz et al. |
| 2013/0139519 A1 | 6/2013 | Kesseli et al. |
| 2013/0145745 A1 | 6/2013 | Kohlenberg et al. |
| 2013/0149099 A1 | 6/2013 | Kohlenberg et al. |
| 2013/0149111 A1 | 6/2013 | Kohlenberg et al. |
| 2013/0149112 A1 | 6/2013 | Kohlenberg et al. |
| 2013/0163905 A1 | 6/2013 | Vintinner et al. |
| 2013/0186060 A1 | 7/2013 | Kosheleff |
| 2013/0186191 A1 | 7/2013 | Djelassi |
| 2013/0189117 A1 | 7/2013 | Baltas et al. |
| 2013/0192199 A1 | 8/2013 | Merry et al. |
| 2013/0192200 A1 | 8/2013 | Kupratis et al. |
| 2013/0192201 A1 | 8/2013 | Kupratis et al. |
| 2013/0192232 A1 | 8/2013 | Clemen |
| 2013/0192238 A1 | 8/2013 | Munsell et al. |
| 2013/0192239 A1 | 8/2013 | Glahn et al. |
| 2013/0192240 A1 | 8/2013 | Munsell et al. |
| 2013/0192241 A1 | 8/2013 | Blackwell et al. |
| 2013/0192242 A1 | 8/2013 | Davis et al. |
| 2013/0192247 A1 | 8/2013 | Blackwell et al. |
| 2013/0192248 A1 | 8/2013 | Ackermann et al. |
| 2013/0192250 A1 | 8/2013 | Glahn et al. |
| 2013/0192251 A1 | 8/2013 | Munsell et al. |
| 2013/0192252 A1 | 8/2013 | Ackermann et al. |
| 2013/0192253 A1 | 8/2013 | Ackermann et al. |
| 2013/0192256 A1 | 8/2013 | Suciu et al. |
| 2013/0192258 A1 | 8/2013 | Kupratis et al. |
| 2013/0192260 A1 | 8/2013 | Mayer et al. |
| 2013/0192261 A1 | 8/2013 | Mayer et al. |
| 2013/0192262 A1 | 8/2013 | Eastwood et al. |
| 2013/0192266 A1 | 8/2013 | Houston et al. |
| 2013/0192519 A1 | 8/2013 | Kim et al. |
| 2013/0195624 A1 | 8/2013 | Schwarz et al. |
| 2013/0195641 A1 | 8/2013 | Povey |
| 2013/0195645 A1 | 8/2013 | Suciu et al. |
| 2013/0195647 A1 | 8/2013 | Muldoon et al. |
| 2013/0199179 A1 | 8/2013 | Kitsukawa et al. |
| 2013/0209291 A1 | 8/2013 | Kitsukawa et al. |
| 2013/0216364 A1 | 8/2013 | Evans |
| 2013/0219856 A1 | 8/2013 | Suciu et al. |
| 2013/0219859 A1 | 8/2013 | Suciu et al. |
| 2013/0219860 A1 | 8/2013 | Suciu et al. |
| 2013/0219895 A1 | 8/2013 | Joshi et al. |
| 2013/0219908 A1 | 8/2013 | Schwarz et al. |
| 2013/0219922 A1 | 8/2013 | Gilson et al. |
| 2013/0220288 A1 | 8/2013 | Klingbeil |
| 2013/0223973 A1 | 8/2013 | Ali |
| 2013/0223992 A1 | 8/2013 | Suciu et al. |
| 2013/0223993 A1 | 8/2013 | Merry et al. |
| 2013/0233970 A1 | 9/2013 | Cottet |
| 2013/0236296 A1 | 9/2013 | Collopy et al. |
| 2013/0255275 A1 | 10/2013 | Schwarz et al. |
| 2013/0259651 A1 | 10/2013 | Kupratis et al. |
| 2013/0259653 A1 | 10/2013 | Schwarz et al. |
| 2013/0263592 A1 | 10/2013 | Lotterman et al. |
| 2013/0269311 A1 | 10/2013 | Wichmann et al. |
| 2013/0269479 A1 | 10/2013 | Van Der Merwe et al. |
| 2013/0276424 A1 | 10/2013 | Topol et al. |
| 2013/0277443 A1 | 10/2013 | Croll et al. |
| 2013/0280031 A1 | 10/2013 | Hurlin et al. |
| 2013/0283821 A1 | 10/2013 | Gilson et al. |
| 2013/0287581 A1 | 10/2013 | Aschermann et al. |
| 2013/0298522 A1 | 11/2013 | Eleftheriou et al. |
| 2013/0305714 A1 | 11/2013 | Rollinger et al. |
| 2013/0305731 A1 | 11/2013 | Morris et al. |
| 2013/0318939 A1 | 12/2013 | Parnin et al. |
| 2013/0318988 A1 | 12/2013 | Robinson |
| 2013/0318998 A1 | 12/2013 | Schwarz et al. |
| 2013/0319010 A1 | 12/2013 | Hui et al. |
| 2013/0321824 A1 | 12/2013 | Hockaday |
| 2013/0323012 A1 | 12/2013 | Dong et al. |
| 2013/0323072 A1 | 12/2013 | Aschermann et al. |
| 2013/0334824 A1 | 12/2013 | Freda |
| 2013/0340406 A1 | 12/2013 | Gallagher et al. |
| 2013/0343876 A1 | 12/2013 | Leblanc et al. |
| 2013/0343896 A1 | 12/2013 | MacKie et al. |
| 2014/0000269 A1 | 1/2014 | Idahosa et al. |
| 2014/0003915 A1 | 1/2014 | Topol et al. |
| 2014/0007585 A1 | 1/2014 | Liu |
| 2014/0030087 A1 | 1/2014 | Soria et al. |
| 2014/0044540 A1 | 2/2014 | Uneura |
| 2014/0061392 A1 | 3/2014 | Karem |
| 2014/0083107 A1 | 3/2014 | Sheridan et al. |
| 2014/0083115 A1 | 3/2014 | Von Nieda |
| 2014/0093350 A1 | 4/2014 | Meisner et al. |
| 2014/0096508 A1 | 4/2014 | McCune et al. |
| 2014/0096509 A1 | 4/2014 | Hasel |
| 2014/0096534 A1 | 4/2014 | Snape et al. |
| 2014/0109571 A1 | 4/2014 | Primus et al. |
| 2014/0112774 A1 | 4/2014 | Freeman et al. |
| 2014/0112784 A1 | 4/2014 | Pascal |
| 2014/0125121 A1 | 5/2014 | Edwards et al. |
| 2014/0130503 A1 | 5/2014 | Leep |
| 2014/0148928 A1 | 5/2014 | Stewart |
| 2014/0154064 A1 | 6/2014 | Bouteiller et al. |
| 2014/0157752 A1 | 6/2014 | Hasel et al. |
| 2014/0157753 A1 | 6/2014 | Hasel et al. |

(56) References Cited

U.S. PATENT DOCUMENTS

| | | |
|---|---|---|
| 2014/0157754 A1 | 6/2014 | Hasel et al. |
| 2014/0157755 A1 | 6/2014 | Hasel et al. |
| 2014/0157756 A1 | 6/2014 | Hasel et al. |
| 2014/0157757 A1 | 6/2014 | Hasel et al. |
| 2014/0165534 A1 | 6/2014 | Hasel et al. |
| 2014/0174056 A1 | 6/2014 | Suciu et al. |
| 2014/0182309 A1 | 7/2014 | Ali |
| 2014/0186158 A1 | 7/2014 | Merry et al. |
| 2014/0190163 A1 | 7/2014 | Maier |
| 2014/0193238 A1 | 7/2014 | Sheridan et al. |
| 2014/0196472 A1 | 7/2014 | Kupratis et al. |
| 2014/0196473 A1 | 7/2014 | Kupratis et al. |
| 2014/0202133 A1 | 7/2014 | Praisner et al. |
| 2014/0205438 A1 | 7/2014 | Hasel |
| 2014/0205457 A1 | 7/2014 | Curlier et al. |
| 2014/0216003 A1 | 8/2014 | Phillips et al. |
| 2014/0219783 A1 | 8/2014 | Coffin et al. |
| 2014/0234078 A1 | 8/2014 | Sheridan et al. |
| 2014/0234089 A1 | 8/2014 | Moradell-Casellas et al. |
| 2014/0245749 A1 | 9/2014 | Mercier et al. |
| 2014/0248116 A1 | 9/2014 | Ali |
| 2014/0248129 A1 | 9/2014 | Merry et al. |
| 2014/0260326 A1 | 9/2014 | Schwarz et al. |
| 2014/0263712 A1 | 9/2014 | Froemming et al. |
| 2014/0270605 A1 | 9/2014 | Rosen et al. |
| 2014/0271112 A1 | 9/2014 | Morin et al. |
| 2014/0271135 A1 | 9/2014 | Sheridan et al. |
| 2014/0277991 A1 | 9/2014 | Skertic et al. |
| 2014/0283500 A1 | 9/2014 | Sabnis |
| 2014/0290211 A1 | 10/2014 | Kupratis et al. |
| 2014/0301837 A1 | 10/2014 | Dezeustre et al. |
| 2014/0308123 A1 | 10/2014 | Nussenblatt et al. |
| 2014/0314541 A1 | 10/2014 | Schwarz et al. |
| 2014/0326826 A1 | 11/2014 | Certain |
| 2015/0337901 A1 | 11/2015 | Hayashi et al. |

FOREIGN PATENT DOCUMENTS

| | | |
|---|---|---|
| CA | 2798211 A1 | 6/2013 |
| CN | 102220904 A | 10/2011 |
| CN | 102483038 A | 5/2012 |
| EP | 0992696 A1 | 4/2000 |
| EP | 1254831 A1 | 11/2002 |
| EP | 2009246 A1 | 12/2008 |
| EP | 2607231 A2 | 6/2013 |
| FR | 2964942 A1 | 3/2012 |
| GB | 1418905 A | 12/1975 |
| GB | 2218747 A | 11/1989 |
| GB | 2226087 A | 6/1990 |
| JP | 50124011 A | 9/1975 |
| JP | 61275550 A | 12/1986 |
| JP | 0216335 A | 1/1990 |
| JP | 02024293 A | 1/1990 |
| JP | 02179598 A | 7/1990 |
| JP | 02238160 A | 9/1990 |
| JP | 02245455 A | 10/1990 |
| JP | 05149328 A | 6/1993 |
| JP | 05149329 A | 6/1993 |
| JP | 05164132 A | 6/1993 |
| JP | 2003286857 A | 10/2003 |
| JP | 2006046322 A | 2/2006 |
| JP | 2007192315 A | 8/2007 |
| JP | 2008519229 A | 6/2008 |
| JP | 2009115139 A | 5/2009 |
| JP | 2010001992 A | 1/2010 |
| JP | 2012521516 A | 9/2012 |
| JP | 2013523526 A | 6/2013 |
| JP | 2013256397 A | 12/2013 |
| JP | 2014088893 A | 5/2014 |
| JP | 2014152788 A | 8/2014 |
| JP | 2014520035 A | 8/2014 |
| JP | 2014173635 A | 9/2014 |
| JP | 2015059645 A | 3/2015 |
| WO | 2006080055 A1 | 8/2006 |
| WO | 2008117413 A1 | 10/2008 |

OTHER PUBLICATIONS

European Search Report and Opinion issued in connection with related EP Application No. 15195349.4 dated Mar. 21, 2016.
U.S. Final Office Action issued in connection with related U.S. Appl. No. 14/873,382 dated Jul. 20, 2016.
European Search Report and Opinion issued in connection with related EP Application No. 16163745.9 dated Sep. 13, 2016.
Unofficial English Translation of Japanese Search Report issued in connection with related JP Application No. 2016066996 dated Feb. 8, 2017.
Unofficial English Translation of Japanese Office Action issued in connection with related JP Application No. 2016066996 dated Feb. 21, 2017.
Canadian Office Action issued in connection with related CA Application No. 2924931 dated Feb. 27, 2017.
European Search Report and Opinion issued in connection with related EP Application No. 16192205.9 dated Mar. 2, 2017.
European Search Report and Opinion issued in connection with corresponding EP Application No. 15168754.8 dated Oct. 29, 2015.
Canadian Office Action issued in connection with corresponding CA Application No. 2891864 dated May 16, 2016.
Unofficial English Translation of Japanese Office Action issued in connection with corresponding JP Application No. 2015105048 dated May 31, 2016.
Chinese Office Action issued in connection with corresponding CN Application No. 201510285220.8 dated Jun. 2, 2017.
Japanese Notice of Allowance issued in connection with related JP Application No. 2016066996 dated Jul. 4, 2017.
Non-Final Rejection towards related U.S. Appl. No. 14/873,382 dated Sep. 19, 2017.

* cited by examiner

VARIABLE-PITCH ROTOR WITH REMOTE COUNTERWEIGHTS

CROSS-REFERENCE TO RELATED APPLICATIONS

This non-provisional application claims the benefit of priority under 35 U.S.C. §119(e) to U.S. Provisional Patent Application No. 62/005,572, entitled "VARIABLE-PITCH ROTOR WITH REMOTE COUNTERWEIGHTS", filed May 30, 2014, which is herein incorporated in its entirety by reference.

BACKGROUND OF THE INVENTION

This invention relates generally to variable-pitch rotors and more particularly to control mechanisms for such rotors.

Aircraft powerplants are typically used to drive thrust-generating airfoil elements such as propellers or fan blades. It is known to vary the angle of incidence (i.e. "pitch angle") of the airfoil elements relative to the rotating hub carrying them, in order to provide the maximum possible propulsive efficiency at various flight conditions.

A common method of pitch control employs a hydraulic actuator which changes the blade pitch angle in response to pressurized fluid flow. The actuator may move the blade through pitch angles from "coarse" to "fine" and may also provide pitch angles suitable for ground operation.

For safety reasons, it is important to limit the blade pitch angle during flight. This avoids overspeeding the powerplant, or imposing excessive structural loads or unexpected yawing moments to the aircraft. A typical prior art variable-pitch rotor includes a mechanical pitch lock which limits the blade pitch angle in the case of actuator failure. Pitch locks can be complicated and themselves subject to failure.

It is also known to provide variable-pitch rotors with counterweights. The counterweights provide a countervailing force that drives the blades to a safe pitch angle in case of actuator failure. However, these are typically mounted to the individual blades and therefore limit design flexibility.

Accordingly, there remains a need for a pitch control mechanism incorporating counterweights not directly mounted to the blades.

BRIEF SUMMARY OF THE INVENTION

This need is addressed by the present invention, which provides a pitch control mechanism having counterweights which are mounted remotely from the blades and which are mechanically interconnected to the blades. The pitch control mechanism allows the design of the counterweights (including for example, their number, size, and position) to be determined independently from the design of the blades and trunnions.

According to one aspect of the invention, a pitch control mechanism includes: a rotor structure configured for rotation about a longitudinal axis; a row of blades carried by the rotor structure, each blade having an airfoil and a trunnion mounted for pivoting movement relative to the rotor structure, about a trunnion axis which is perpendicular to the longitudinal axis; a unison ring interconnecting the blades; an actuator connected to the unison ring and the rotor structure, operable to move the unison ring relative to the rotor structure; at least one moveable counterweight carried by the rotor structure, remote from the blades; and an interconnection between the blades and the counterweight, such that movement of the counterweight causes a change in the pitch angle of the blades.

According to another aspect of the invention, the actuator is configured to produce rotary movement between the rotor structure and the unison ring.

According to another aspect of the invention, the unison ring and counterweights are interconnected by gears.

According to another aspect of the invention, the rotor structure carries an array of counterweight assemblies each including: a pinion shaft, a pinion gear, and a counterweight with an offset mass.

According to another aspect of the invention, all of the pinion gears are engaged with a ring gear that is part of the unison ring, and with a sun gear that is stationary relative to the rotor structure.

According to another aspect of the invention, the pinion gears are meshed with a ring gear that is part of the unison ring.

According to another aspect of the invention, each counterweight includes a hollow shell with a slug of high-density material inside.

According to another aspect of the invention, each trunnion is connected to the unison ring with a yoke.

According to another aspect of the invention, each yoke includes a pin that engages a pivot hole in a slider that is mounted for longitudinal sliding movement in the unison ring.

According to another aspect of the invention, the trunnions are connected to the unison ring by a geared connection.

According to another aspect of the invention, the counterweights are mounted to a pinion shaft that rotates about a radial axis.

According to another aspect of the invention, the trunnions are connected to the unison ring by a geared connection.

According to another aspect of the invention, the actuator is configured to produce linear movement between the rotor structure and the unison ring.

According to another aspect of the invention, the actuator is configured to produce linear movement between the rotor structure and the unison ring; and the trunnions are connected to the counterweights by a geared connection.

According to another aspect of the invention, the actuator is configured to produce linear movement between the rotor structure and the unison ring; and the counterweights are connected to the actuator by a geared connection.

According to another aspect of the invention, the pitch angle is variable between a fine pitch angle and a coarse pitch angle, and the counterweights are configured to drive the pitch angle towards the coarse pitch angle.

According to another aspect of the invention, a gas turbine engine includes: turbomachinery core operable to produce a core gas flow; a low pressure turbine positioned downstream of the turbomachinery core; an inner shaft coupled to the low pressure turbine; and the pitch control mechanism described above, wherein the rotor structure is coupled to the inner shaft.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
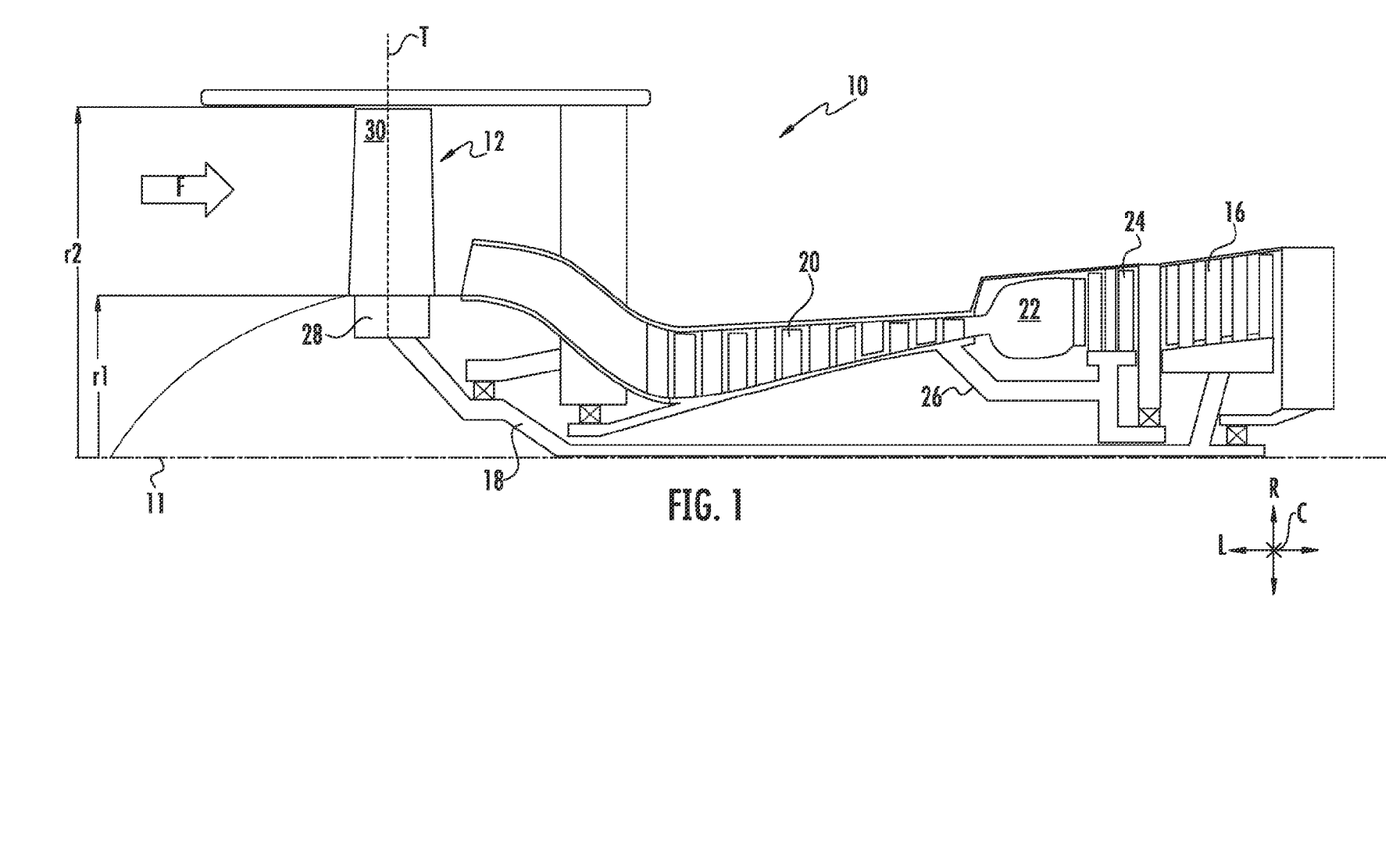
FIG. 1 is a half-sectional, schematic view of a gas turbine engine incorporating variable-pitch fan blades.

Referring to the drawings wherein identical reference numerals denote the same elements throughout the various views, FIG. 1 depicts a gas turbine engine 10. The engine 10 has a longitudinal axis 11 and includes a fan 12 and a low pressure turbine ("LPT") 16 collectively referred to as a "low pressure system". The LPT 16 drives the fan 12 through an inner shaft 18, also referred to as an "LP shaft". The engine 10 also includes a high pressure compressor ("HPC") 20, a combustor 22, and a high pressure turbine ("HPT") 24, collectively referred to as a "gas generator" or "core". The HPT 24 drives the HPC 20 through an outer shaft 26, also referred to as an "HP shaft". Together, the high and low pressure systems are operable in a known manner to generate a primary or core flow as well as a fan flow or bypass flow. While the illustrated engine 10 is a high-bypass turbofan engine, the principles described herein are equally applicable to any other type of engine requiring variable-pitch blades, including turboprop engines and piston aircraft engines.

Figure 2:
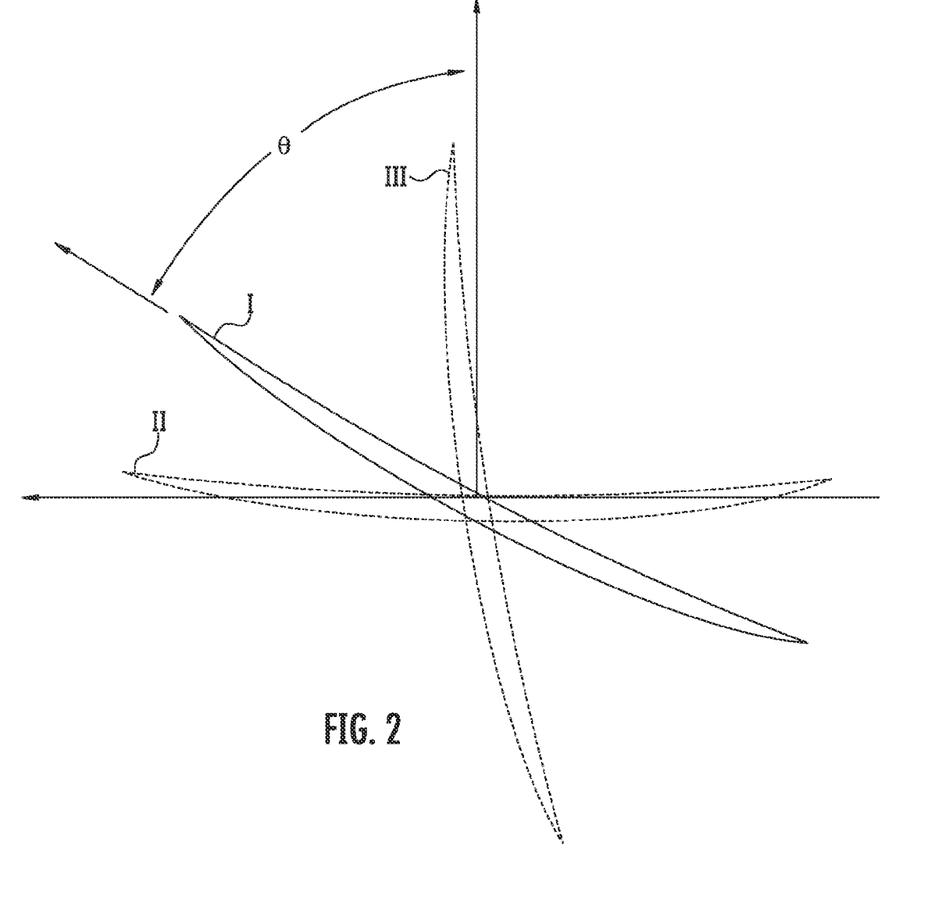
FIG. 2 is a schematic diagram illustrating different pitch positions of a blade of the pitch control mechanism.

The fan 12 includes an annular array of blades 28. Each blade 28 includes an airfoil 30 mounted to that it can pivot about a trunnion axis "T" which extends radially from the longitudinal axis 11. Pivoting motion of the blade 28 about this axis changes its pitch angle θ. As seen in FIG. 2 the pitch angle θ is defined as the angle between a zero-lift line of the airfoil 30 and a plane perpendicular to the longitudinal axis 11. A blade is shown at an intermediate pitch angle at "I", while a blade is shown at a maximum high (or coarse) pitch angle at "II", corresponding to a feathered condition, and a low (or fine) pitch angle at "III".

It is noted that, as used herein, the term "axial" or "longitudinal" refers to a direction parallel to an axis of rotation of a gas turbine engine, while "radial" refers to a direction perpendicular to the axial direction, and "tangential" or "circumferential" refers to a direction mutually perpendicular to the axial and tangential directions. (See arrows "L", "R", and "C" in FIG. 1). As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

Figure 3:
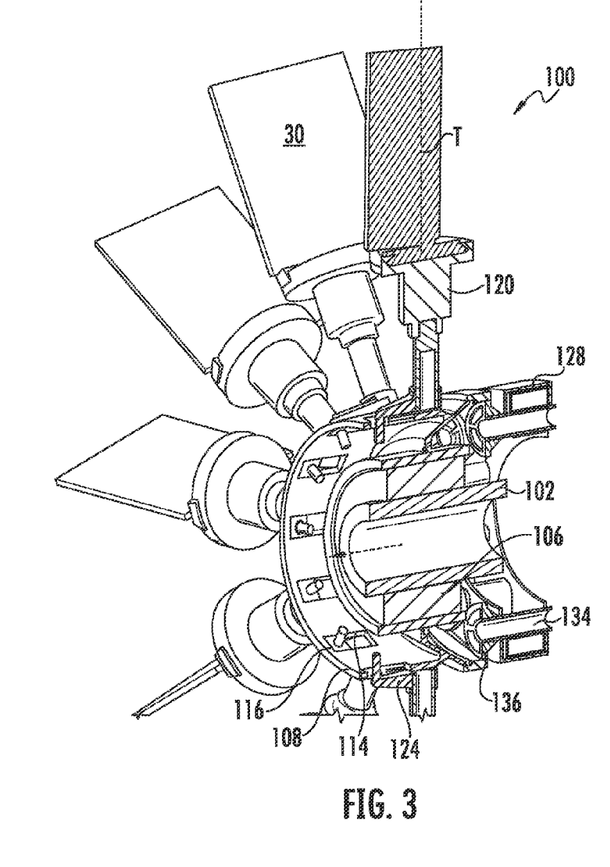
FIG. 3 is sectioned, schematic, perspective view of a pitch control mechanism constructed according to an aspect of the present invention.
Figure 4:
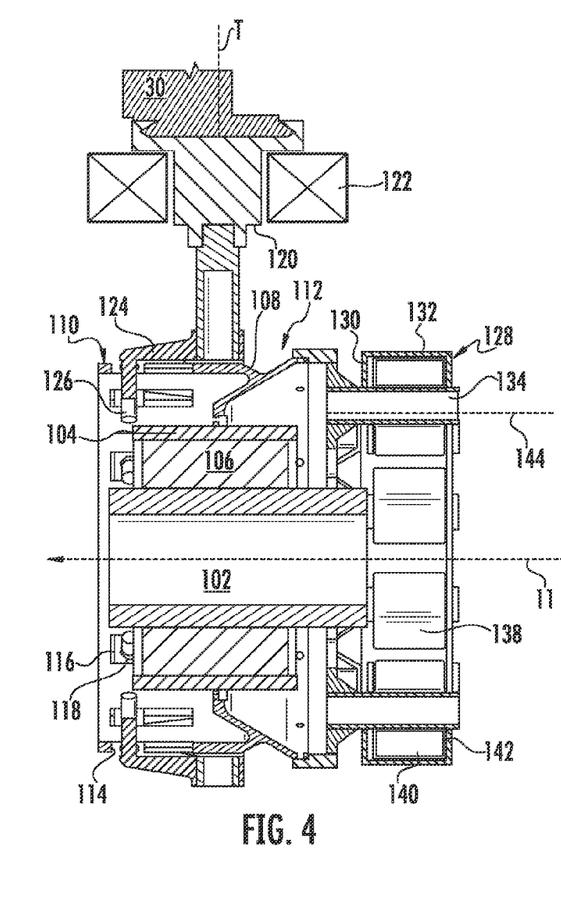
FIG. 4 is a cross-sectional view of the mechanism of FIG. 3.
Figure 5:
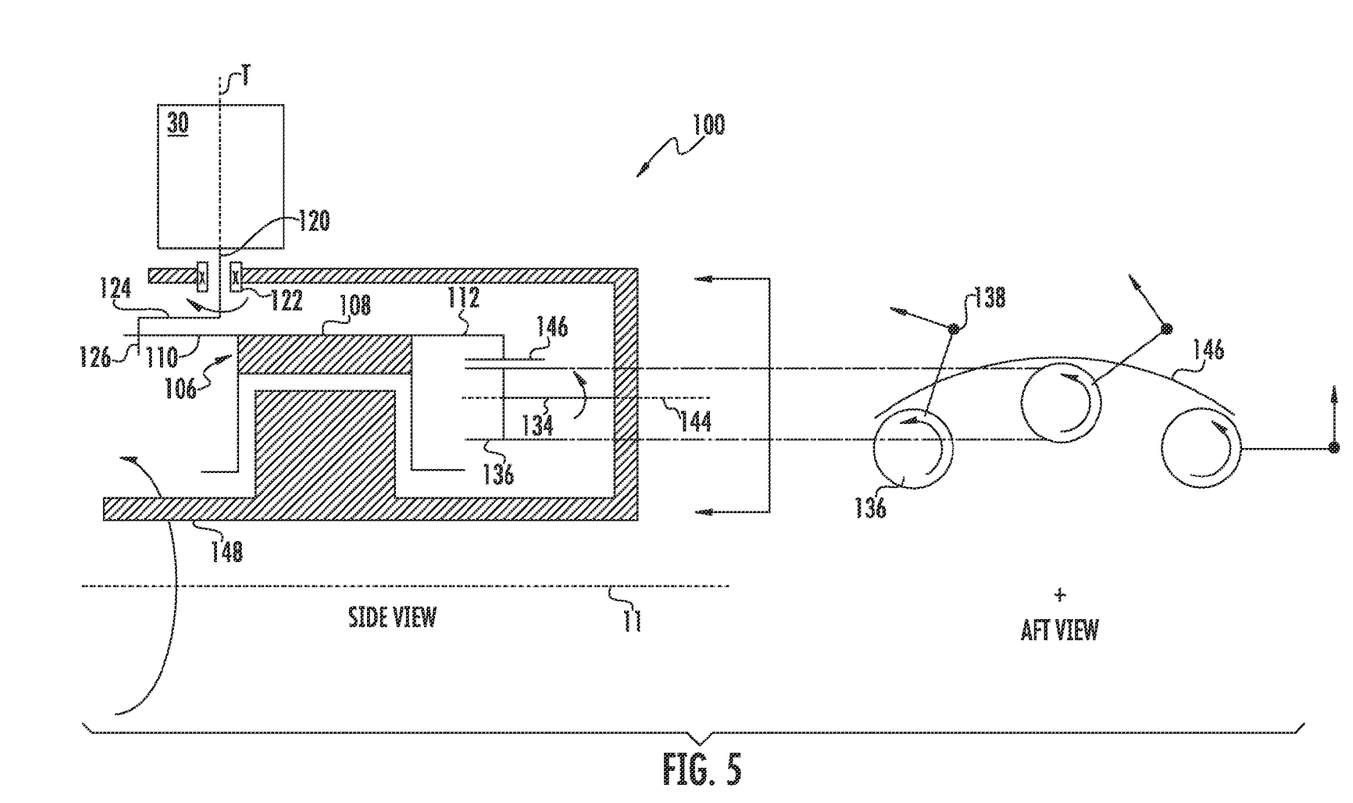
FIG. 5 is a functional diagram of the mechanism of FIG. 3.

FIGS. 3 and 4 illustrate pictorially an exemplary pitch control mechanism 100 constructed according to an aspect of the present invention, while FIG. 5 is a functional diagram showing the pitch control mechanism 100 in half-section. The pitch control mechanism 100 is one of several mechanisms that may be used to control the pitch angle θ of the blades 28 shown in FIG. 1. The pitch control mechanism 100 includes a centrally-mounted rotor shaft 102 which rotates about the longitudinal axis 11. In operation it would be coupled to and rotated by the engine 10, for example by the inner shaft 18 shown in FIG. 1. A drum 104 surrounds the rotor shaft 102 and is functionally coupled to the rotor shaft by an actuator 106.

The actuator 106 is shown schematically in FIGS. 3 and 4. The actuator 106 may be any mechanism which is effective to selectively rotate the drum 104 about the longitudinal axis 11, and thereby change the relative angular orientation of the drum 104 and the rotor shaft 102. Known types of actuators include electrical, mechanical, and hydraulic devices. The actuator 106 may operate to provide rotary motion directly, or a linear actuator may be used with an appropriate mechanism to covert its motion to a rotary output, so long as the ultimate movement of the drum 104 is rotary.

An annular unison ring 108 with forward and aft ends 110 and 112, respectively, surrounds the drum 104 and is coupled to the drum 104 so as to rotate in unison therewith. A plurality of axially-oriented slots 114 are formed around the periphery of the unison ring 108, adjacent the forward end 110. Optionally, a slider 116 is disposed in each slot 114 and is free to move longitudinally forward or aft therein. Each slider 116 has a pivot hole 118 passing therethrough.

Blades 28 are arrayed around the unison ring 108. The airfoil 30 of each blade 28 is attached to a trunnion 120 carried in suitable trunnion bearings 122, so that the blade 28 can pivot about the trunnion axis "T" as shown in FIG. 1. An inner end of each trunnion 120 is connected to the aft end of a yoke 124. The forward end of each yoke 124 includes a pin 126 that extends radially inward and passes through the pivot hole 118 in one of the sliders 116. Thus connected, rotary motion of the unison ring 108 causes a simultaneous change in the pitch angle θ of all the blades 28.

A carrier 128 shaped like a shallow cylinder with a forward disk 130 and a peripheral wall 132 is disposed aft of the unison ring 108, and is mounted for rotation in unison with the rotor shaft 102. The carrier 128 includes a plurality of counterweight assemblies. Each counterweight assembly comprises a pinion shaft 134 aligned parallel to the longitudinal axis 11 and passing through the forward disk 130, with a pinion gear 136 mounted at its forward end and a counterweight 138 at its aft end. The counterweight 138 comprises an offset mass. In other words, the center of mass of the counterweight 138 is not coaxial with the pinion shaft axis 144. In the illustrated example, each counterweight 138 is constructed from a hollow housing 140 with a slug 142 of dense material inside. Each assembly of pinion gear 136, pinion shaft 134, and counterweight 138 is rotatable as a unit relative to the carrier 128, about that respective assembly's pinion shaft axis 144.

An internal ring gear 146 is carried at the aft end 112 of the unison ring 108, and all of the pinion gears 136 are meshed with the ring gear 146. Thus connected, the movement of the blades 28, unison ring 108, and counterweights 138 are linked together such that rotary motion of the unison ring 108 (for example, caused by the actuator 106) will cause a simultaneous change in the pitch angle θ of all of the blades 28, and of the angular orientation of all of the counterweights 138. Furthermore, the unison ring 108 and gear train transmits forces between the blades 28 and the counterweights 138.

During engine operation, the rotor shaft 102 and the carrier 128, along with the pinion gears 136, pinion shafts 124, and counterweights 138, rotate about the longitudinal axis 11. In FIG. 5, a rotor structure 148 is shown which functionally represents the rotor shaft 102, carrier 128, and a structure carrying the trunnion bearings 122, all of which rotate in unison about the longitudinal axis 11. Typically, a selected torque would be input to the rotor structure 102 through the LP shaft 18 (see FIG. 1). At the same time, the actuator 106 is used to move the unison ring 108 and the blades to a selected pitch angle θ. In accordance with known principles, coarse pitch angles θ increase the aerodynamic drag on the blades 28 and result in a lower rotor rotational speed (designated "N1"), and finer pitch angles result in a higher rotational speed N1.

During normal operation, the actuator 106 is effective to move both the blades 28 and the counterweights 138, so that the blades 28 take up the desired pitch angle θ. During actuator failure, the sum of aerodynamic and mass forces acting on the blades 28 tend to drive them to a fine pitch angle θ. Therefore, a failure of the actuator 106 could result in N1 increasing to an unacceptably high speed. However, the counterweights 138 provide a countervailing force to drive the blades to a safe pitch angle (i.e. a feathered position).

More specifically, each counterweight 138 is subject to a reactive centrifugal force acting radially outward, computed as $F=m\omega^2/r$, where m is the mass of the counterweight 138, ω is the rotational velocity (i.e. $2\pi/60 \times N1$), and r is the distance of the center of mass of the counterweight 138 from the longitudinal axis 11. Because the counterweights 138 are offset from the axes 144, the counterweights 138 apply a torque to the pinion shafts 134, thereby rotating the pinion gears 136. Ultimately, the pitch angle θ of the blades 28 is determined by the dynamic balance of the blade forces and the counterweight forces. When the mechanism 100 is assembled, the angular orientation of the counterweight assemblies about their axes 144 are set relative to the blades 28 such that the counterweight torque tends to move the blades towards a full coarse or feathered position. The individual counterweight mass, number of counterweights 138, lever arm dimension, and the mechanical advantage between the counterweights 138 and the blades 28 is selected to achieve the desired pitch angle θ during periods of actuator failure.

The functional principles of remotely-mounted counterweights described above may be implemented using various physical configurations, several examples of which are described below.

Figure 6:
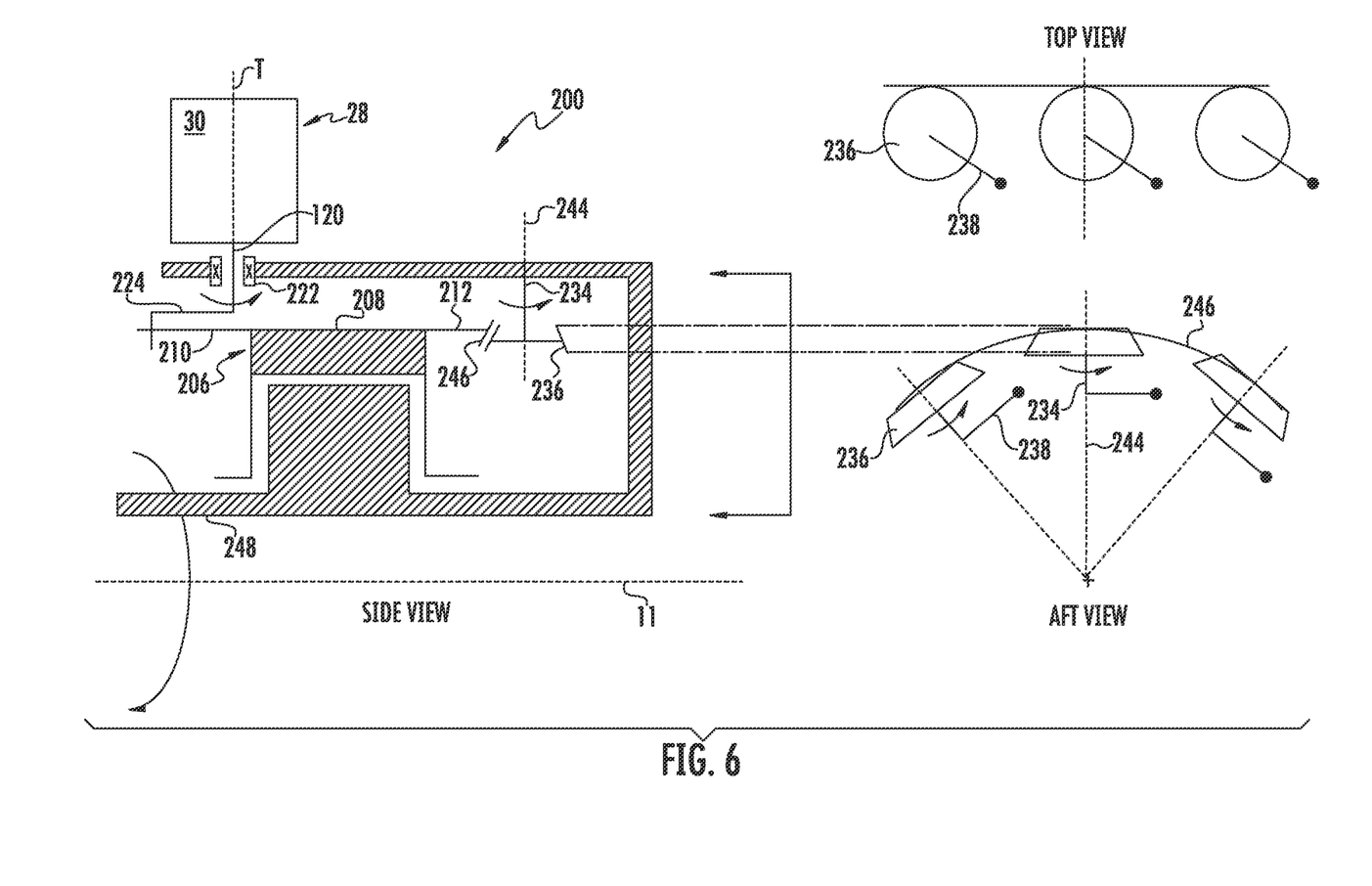
FIG. 6 is a functional diagram of an alternative pitch control mechanism.

FIG. 6 illustrates an alternative pitch control mechanism 200. The pitch control mechanism 200 includes a rotor structure 248 which rotates about the longitudinal axis 11, an annular unison ring 208 with forward and aft ends 210 and 212, respectively, and an actuator 206 effective to rotate the unison ring 208 about the longitudinal axis 11, and thereby change the relative angular orientation of the unison ring 208 and the rotor structure 248.

A plurality of blades 28 are arrayed around the unison ring 208. Each blade 28 includes an airfoil 30 attached to a trunnion 120 carried in suitable bearings 222, such that the blade 28 can pivot about a trunnion axis "T". The trunnions 120 are coupled to the forward end 210 of the unison ring 208 by yokes 224, such that rotary motion of the unison ring 208 causes a simultaneous change in the pitch angle θ of all the blades 28.

A plurality of counterweight assemblies are carried by the rotor structure 248. Each counterweight assembly comprises a pinion shaft 234 aligned along a radial axis, with a pinion bevel gear 236 mounted at one end and a counterweight 238 at the other end. The counterweight 238 comprises an offset mass, and is moveable in a plane tangential to the longitudinal axis 11. The entire assembly of pinion bevel gear 236, pinion shaft 234, and counterweight 238 is rotatable as a unit relative to the rotor structure 248, about that respective assembly's pinion shaft axis 244.

A ring bevel gear 246 is carried at the aft end 212 of the unison ring 208, and all of the pinion bevel gears 236 are meshed with the ring bevel gear 246. Thus connected, the movement of the blades 28, unison ring 208, and counterweights 238 are linked together such that rotary motion of the unison ring 208 (for example, caused by the actuator 206) will cause a simultaneous change in the pitch angle θ of all of the blades 28, and of the angular orientation of all of the counterweights 238. Furthermore, the unison ring 208 transmits forces between the blades 28 and the counterweights 238.

The overall function of the mechanism 200 is the same as the mechanism 100 described above, with the counterweights 238 providing a countervailing force through the gear train and unison ring 208, to drive the blades 28 to a safe, preselected pitch angle (i.e. a feathered position) in the case of actuator failure.

Figure 7:
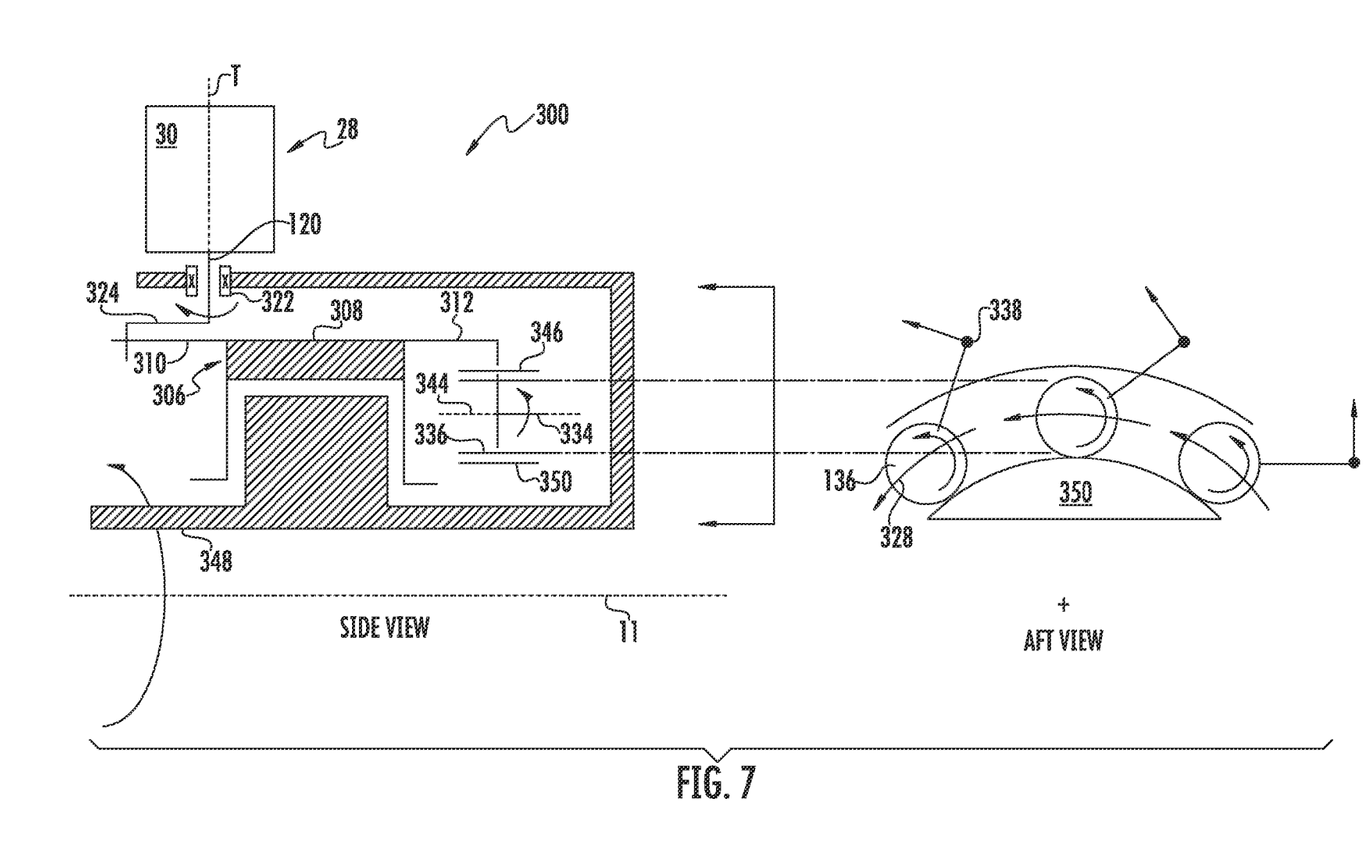
FIG. 7 is a functional diagram of an alternative pitch control mechanism.

FIG. 7 illustrates an alternative pitch control mechanism 300. The mechanism 300 includes a rotor structure 348 which rotates about the longitudinal axis 11, an annular unison ring 308 with forward and aft ends 310 and 312, respectively, and an actuator 306 effective to rotate the unison ring 308 about the longitudinal axis 11, and thereby change the relative angular orientation of the unison ring 308 and the rotor structure 348.

Blades 28 are arrayed around the unison ring 308. Each blade 28 includes an airfoil 30 attached to a trunnion 120 carried in suitable bearings 322, such that the blade 28 can pivot about a trunnion axis "T". The trunnions 120 are coupled to the forward end 310 of the unison ring 308 by yokes 324, such that rotary motion of the unison ring 308 causes a simultaneous change in the pitch angle θ of all the blades 28.

A plurality of counterweight assemblies are carried by an annular carrier 328 which is free to rotate relative to the rotor structure 348. Each counterweight assembly comprises a pinion shaft 334 aligned along an axis parallel to the longitudinal axis, with a pinion gear 336 mounted at one end and a counterweight 338 at the other end. The counterweight 338 comprises an offset mass. The entire assembly of pinion gear 336, pinion shaft 334, and counterweight 338 is rotatable as a unit relative to the carrier 328, about that respective assembly's pinion shaft axis 344.

An internal ring gear 346 is carried at the aft end 312 of the unison ring 308, and all of the pinion gears 336 are meshed with the internal ring gear 346, as well as a central sun gear 350 that is fixed to the rotor structure 348. Thus connected, the movement of the blades 28, unison ring 308, and counterweights 338 are linked together such that rotary motion of the unison ring 308 (for example, caused by the actuator 306) will cause a simultaneous change in the pitch angle θ of all of the blades 28, and of the angular orientation of all of the counterweights 338. Furthermore, the unison ring 308 transmits forces between the blades 28 and the counterweights 338.

The overall function of the mechanism 300 is the same as the mechanism above, with the counterweights 338 providing a countervailing force through the gear train and unison ring 308, to drive the blades 28 to a safe pitch angle (i.e. a feathered position) in the case of actuator failure.

Figure 8:
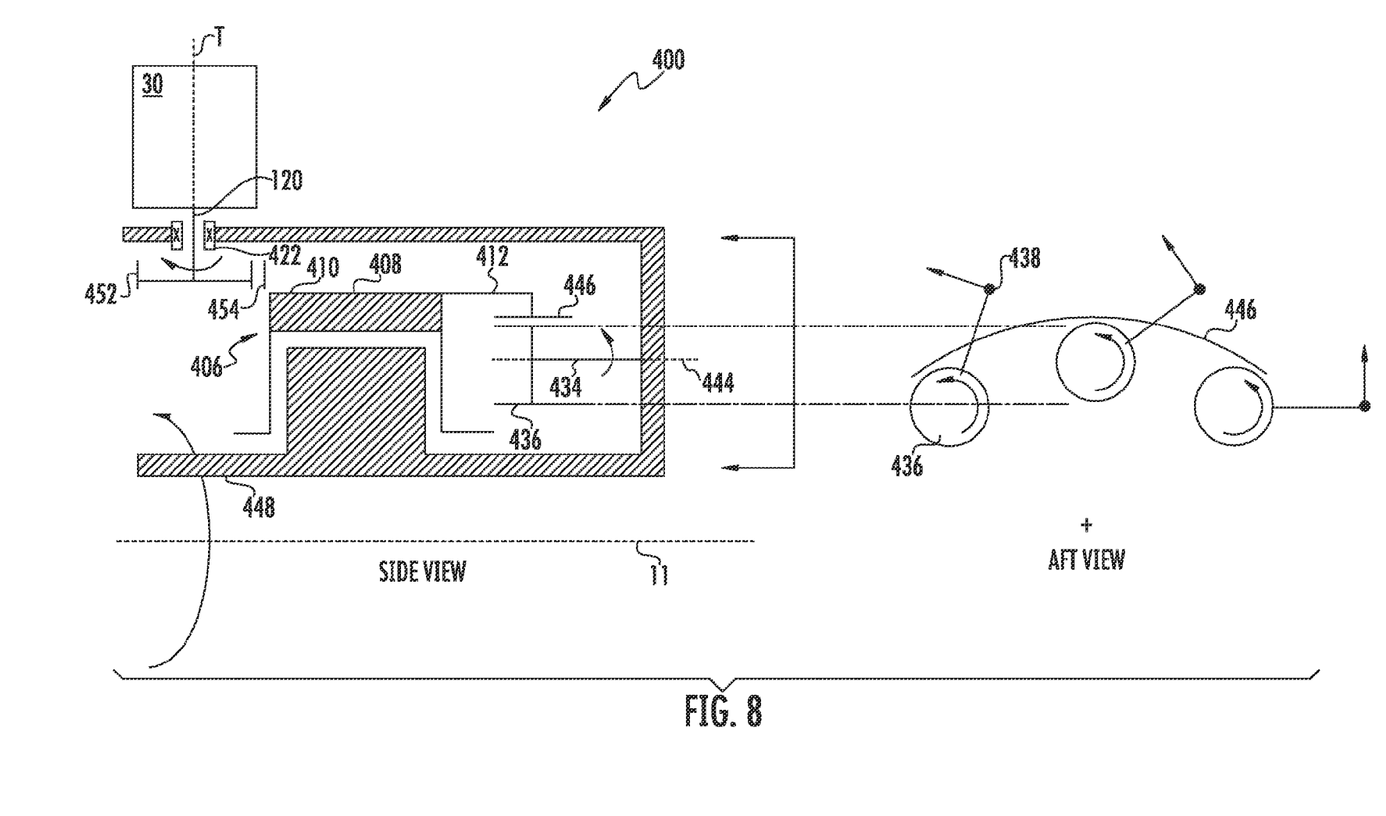
FIG. 8 is a functional diagram of an alternative pitch control mechanism.

FIG. 8 illustrates an alternative pitch control mechanism 400. The mechanism 400 includes a rotor structure 448 which rotates about the longitudinal axis 11, an annular unison ring 408 with forward and aft ends 410 and 412, respectively, and an actuator 406 effective to rotate the unison ring 408 about the longitudinal axis 11, and thereby change the relative angular orientation of the unison ring 408 and the rotor structure 448.

A plurality of blades 28 are arrayed around the unison ring 408. Each blade 28 includes an airfoil 30 attached to a trunnion 120 carried in suitable bearings 422, such that the blade 28 can pivot about a trunnion axis "T". Each trunnion 120 has a trunnion bevel gear 452 mounted at its inner end. A ring bevel gear 454 is disposed at the forward end 410 of the unison ring 408, and all of the trunnion bevel gears 452 are meshed with the ring bevel gear 454. Thus arranged, rotary motion of the unison ring 408 causes a simultaneous change in the pitch angle $\theta$ of all the blades 28.

A plurality of counterweight assemblies are carried by an annular carrier which is free to rotate relative to the rotor structure 448. Each counterweight assembly comprises a pinion shaft 434 aligned along an axis parallel to the longitudinal axis 11, with a pinion gear 436 mounted at one end and a counterweight 438 at the other end. The counterweight 438 comprises an offset mass. The entire assembly of pinion gear 436, pinion shaft 434, and counterweight 438 is rotatable as a unit relative to the rotor structure 448, about that respective assembly's pinion shaft axis 444.

An internal ring gear 446 is carried at the aft end 412 of the unison ring 408, and all of the pinion gears 436 are meshed with the internal ring gear 446. Thus connected, the movement of the blades 28, unison ring 408, and counterweights 438 are linked together such that rotary motion of the unison ring 408 (for example, caused by the actuator 406) will cause a simultaneous change in the pitch angle $\theta$ of all of the blades 28, and of the angular orientation of all of the counterweights 438. Furthermore, the unison ring 408 transmits forces between the blades 28 and the counterweights 438.

The overall function of the mechanism 400 is the same as the mechanism above, with the counterweights 438 providing a countervailing force through the gear train and unison ring 408, to drive the blades 28 to a safe pitch angle (i.e. a feathered position) in the case of actuator failure.

Figure 9:
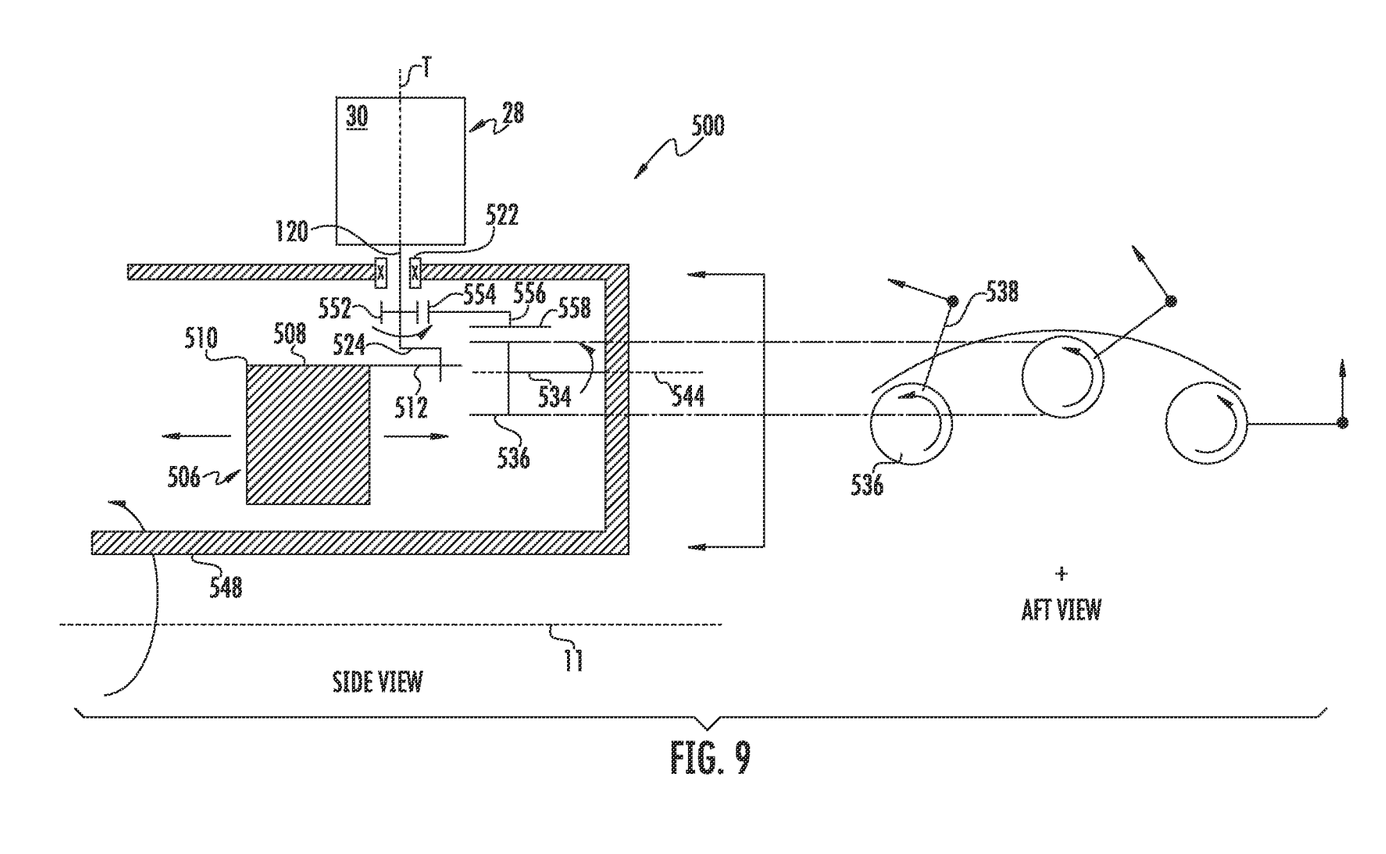
FIG. 9 is a functional diagram of an alternative pitch control mechanism.

FIG. 9 illustrates an alternative pitch control mechanism 500. The mechanism 500 includes a rotor structure 548 which rotates about the longitudinal axis 11, an annular unison ring 508 with forward and aft ends 510 and 512, respectively. An actuator 506 is mounted between the unison ring 508 and the rotor structure and is effective to move the unison ring 508 relative to the rotor structure. The motion may be either linear or rotary.

A plurality of blades 28 are arrayed around the unison ring 508. Each blade 28 includes an airfoil 30 attached to a trunnion 120 carried in suitable bearings 522, such that the blade 28 can pivot about a trunnion axis "T". The trunnions 120 are coupled to the aft end 512 of the unison ring 508 by yokes 524, such that linear or rotary motion of the unison ring 508 causes a simultaneous change in the pitch angle $\theta$ of all the blades 28. Each trunnion 120 has a trunnion gear 552 mounted adjacent the yoke 524. All of the trunnion gears 552 are meshed with a ring gear 554 of an annular coupler 556.

A plurality of counterweight assemblies are carried by an annular carrier which is free to rotate relative to the rotor structure 548. Each counterweight assembly comprises a pinion shaft 534 aligned along an axis parallel to the longitudinal axis, with a pinion gear 536 mounted at one end and a counterweight 538 at the other end. The counterweight 538 comprises an offset mass. The entire assembly of pinion gear 536, pinion shaft 534, and counterweight 538 is rotatable as a unit relative to the rotor structure 548, about that respective assembly's pinion shaft axis 544.

The coupler 556 also includes an internal ring gear 558, and all of the pinion gears 536 are meshed with the internal ring gear 558. Thus connected, the movement of the blades 28, unison ring 508, and counterweights 538 are linked together such that rotary motion of the unison ring 508 (for example, caused by the actuator 506) will cause a simultaneous change in the pitch angle $\theta$ of all of the blades 28, and of the angular orientation of all of the counterweights 538. Furthermore, the unison ring 508 transmits forces between the blades 28 and the counterweights 538.

The overall function of the mechanism 500 is the same as the mechanism above, with the counterweights 538 providing a countervailing force through the gear train and unison ring 508, to drive the blades 28 to a safe pitch angle (i.e. a feathered position) in the case of actuator failure.

Figure 10:
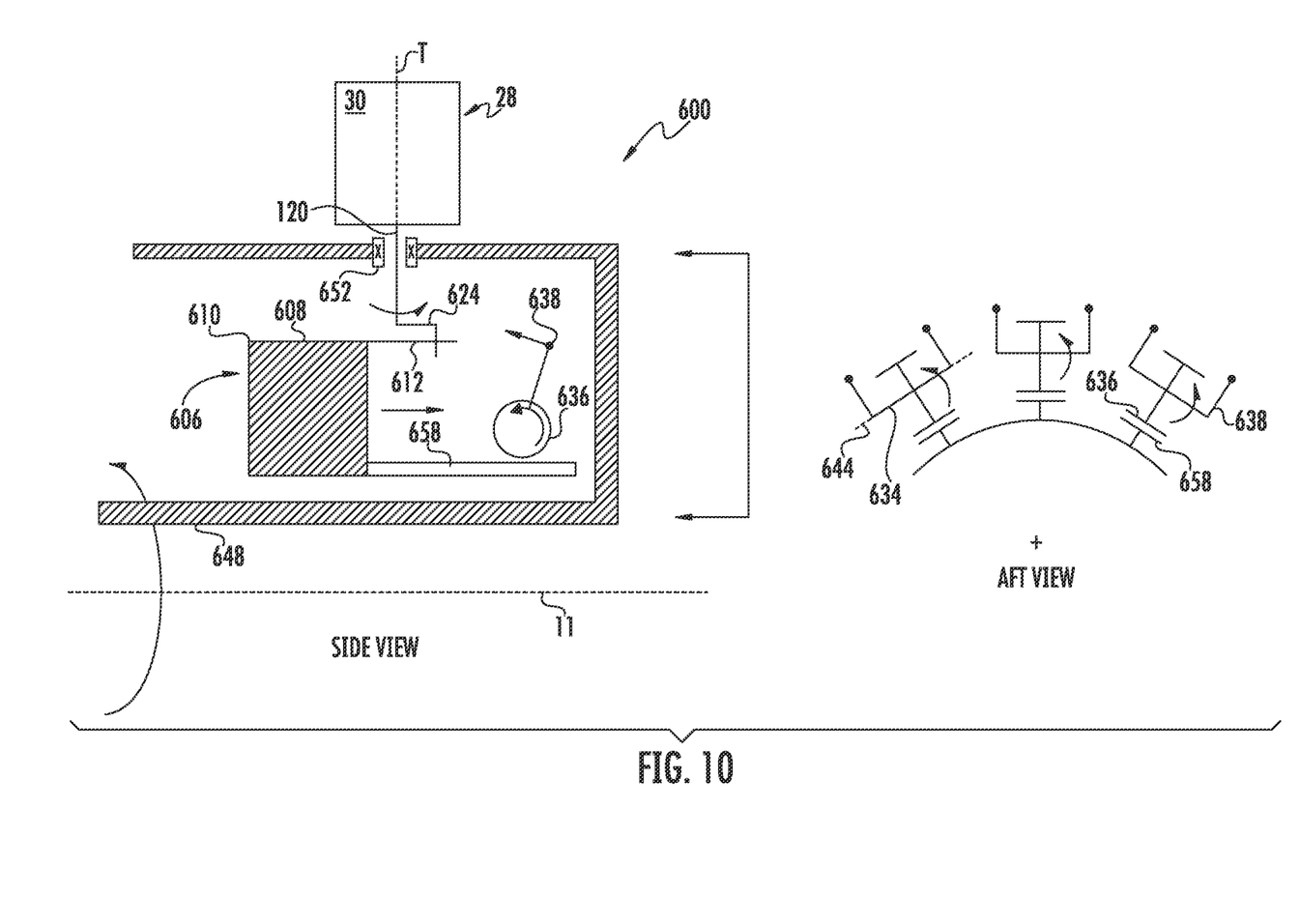
FIG. 10 is a functional diagram of an alternative pitch control mechanism.

FIG. 10 illustrates an alternative pitch control mechanism 600 The mechanism 600 includes a rotor structure 648 which rotates about the longitudinal axis 11, an annular unison ring 608 with forward and aft ends 610 and 612, respectively. An actuator 606 is mounted between the unison ring 608 and the rotor structure and is effective to move the unison ring 608 in a linear motion relative to the rotor structure.

A plurality of blades 28 are arrayed around the unison ring 608. Each blade 28 includes an airfoil 30 attached to a trunnion 120 carried in suitable bearings 622, such that the blade 28 can pivot about a trunnion axis "T". The trunnions 120 are coupled to the aft end 612 of the unison ring 608 by yokes 624, such that linear motion of the unison ring 608 causes a simultaneous change in the pitch angle $\theta$ of all the blades 28.

A plurality of counterweight assemblies are arrayed around the actuator 606. Each counterweight assembly comprises a pinion shaft 634 aligned along an axis 644 tangential to the longitudinal axis 11, with a pinion gear 636 mounted at one end and a counterweight 638 at the other end. The counterweight 638 comprises an offset mass. The entire assembly of pinion gear 636, pinion shaft 634, and counterweight 638 is rotatable as a unit, about that respective assembly's pinion shaft axis 644.

The unison ring 608 also includes one or more axially-extending rack gears 658, and all of the pinion gears 636 are meshed with the rack gears 658. Thus connected, the movement of the blades 28, unison ring 608, and counterweights 638 are linked together such that rotary motion of the unison ring 608 (for example, caused by the actuator 606) will cause a simultaneous change in the pitch angle $\theta$ of all of the blades 28, and of the angular orientation of all of the counterweights 638. Furthermore, the unison ring 608 transmits forces between the blades 28 and the counterweights 638.

The overall function of the mechanism 600 is the same as the mechanism above, with the counterweights 638 providing a countervailing force through the gear train and unison ring 608, to drive the blades 28 to a safe pitch angle (i.e. a feathered position) in the case of actuator failure.

The pitch control mechanisms described herein permit the safe control of blade pitch angle in the event of actuator failure, while permitting design flexibility in the number, size, and location of the counterweights. Among other advantages is the ability to reduce the size of the hub. Referring to FIG. 1, the fan hub radius ratio is defined as the fan blade leading edge hub diameter "r1" divided by the overall fan blade tip radius "r2", or r1/r2. Because of the need to incorporate counterweights attached to the blades within the hub, prior art pitch control mechanisms often have a radius ratio significantly greater than 0.5. In contrast, the mechanism described herein, where the counterweights are moved away from the fan blades, permit ratios significantly less than 0.5, potentially less than 0.35, and further potentially less than 0.25. This will increase the aerodynamic efficiency of the fan.

The foregoing has described a variable-pitch rotor with remote counterweights. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A pitch control mechanism, comprising:
    a rotor structure configured for rotation about a longitudinal axis;
    a row of blades carried by the rotor structure, each blade having an airfoil and a trunnion mounted for pivoting movement relative to the rotor structure, about a trunnion axis which is perpendicular to the longitudinal axis;
    a unison ring interconnecting the blades;
    an actuator connected to the unison ring and the rotor structure, operable to move the unison ring relative to the rotor structure;
    at least on moveable counterweight carried by the rotor structure, remote from the blades; and
    an interconnection between the blades and the at least one counterweight, such that movement of the at least one counterweight causes a change in the pitch angle of the blades,
    wherein the rotor structure carries an array of counterweight assemblies comprising at least one pinion gear, and wherein the at least one pinion gear is engaged with a ring gear that is part of the unison ring and with a sun gear that is stationary relative to the rotor structure.

2. The pitch control mechanism of claim 1 wherein the actuator is configured to produce rotary movement between the rotor structure and the unison ring.

3. The pitch control mechanism of claim 1 wherein the unison ring and the at least one counterweight are interconnected by gears.

4. The pitch control mechanism of claim 1 wherein the array of counterweight assemblies further comprises: at least one pinion shaft, and the at least one counterweight with an offset mass.

5. The pitch control mechanism of claim 1 wherein the at least one pinion gear is meshed with a ring gear that is part of the unison ring.

6. The pitch control mechanism of claim 1 wherein each of the at least one counterweight includes a hollow shell with a slug therein.

7. The pitch control mechanism of claim 1 wherein each trunnion is connected to the unison ring with a yoke.

8. The pitch control mechanism of claim 7 wherein each yoke includes a pin that engages a pivot hole in a slider that is mounted for longitudinal sliding movement in the unison ring.

9. The pitch control mechanism of claim 7 wherein the trunnions are connected to the unison ring by a geared connection.

10. The pitch control mechanism of claim 1 wherein the counterweights are mounted to a pinion shaft that rotates about a radial axis.

11. The pitch control mechanism of claim 1 wherein the trunnions are connected to the unison ring by a geared connection.

12. The pitch control mechanism of claim 1 wherein the actuator is configured to move the rotor structure and the unison ring linearly relative to each other.

13. The pitch control mechanism of claim 1 wherein:
    the actuator is configured to move the rotor structure and the unison ring linearly relative to each other; and
    the trunnions are connected to the counterweights by a geared connection.

14. The pitch control mechanism of claim 13 wherein each trunnion is connected to the unison ring with a yoke.

15. The pitch control mechanism of claim 1 wherein:
    the actuator is configured to move the rotor structure and the unison ring linearly relative to each other; and
    the counterweights are connected to the actuator by a geared connection.

16. The pitch control mechanism of claim 15 wherein each trunnion is connected to the unison ring with a yoke.

17. The pitch control mechanism of claim 1, wherein the pitch angle is variable between a fine pitch angle and a coarse pitch angle, and the counterweights are configured to drive the pitch angle towards the coarse pitch angle.

18. A gas turbine engine, comprising:
    a turbomachinery core operable to produce a core gas flow;
    a low pressure turbine positioned downstream of the turbomachinery core;
    an inner shaft coupled to the low pressure turbine;
    a rotor structure coupled to the inner shaft;
    a row of blades carried by the rotor structure, each blade having an airfoil and a trunnion mounted for pivoting movement relative to the rotor structure, about a trunnion, axis which is perpendicular to the longitudinal axis;
    a unison ring interconnecting the blades;
    an actuator connected to the unison ring and the rotor structure, operable to move the unison ring relative to the rotor structure;
    at least one moveable counterweight carried by the rotor structure, remote from the blades; and an interconnection between the blades and the at least one counterweight, such that movement of the at least one counterweight causes a change in the pitch angle of the blades, wherein the rotor structure carries an array of counterweight assemblies comprising at least one pinion gear, and wherein the at least one pinion gear is engaged with a ring gear that is part of the unison ring and with a sun gear that is stationary relative to the rotor structure.

19. The gas turbine engine of claim 18 wherein the pitch angle is variable between a fine pitch angle and a coarse pitch angle, and the at least one counterweight is configured to drive the pitch angle towards the coarse pitch angle.

\* \* \* \* \*